June 26, 1923.
G. F. FOWLER
1,459,909
DEVICE FOR ADJUSTING BOWL AND BOWL SPINDLES ON CENTRIFUGAL SEPARATORS
Filed March 29, 1920
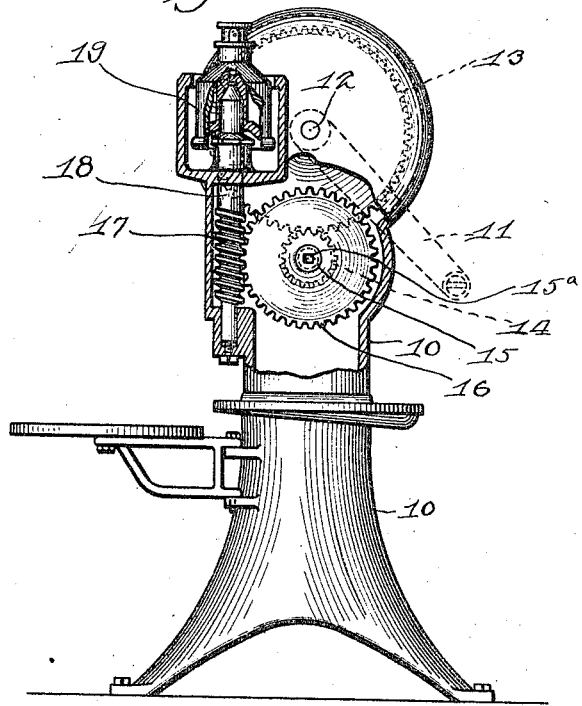
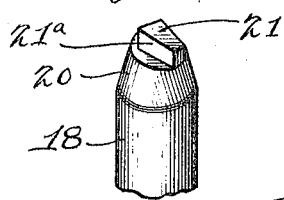
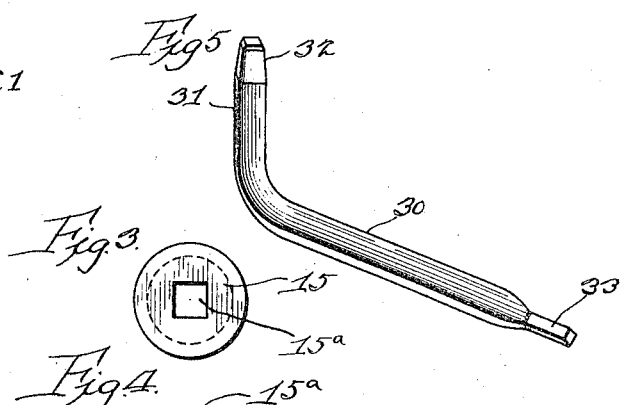
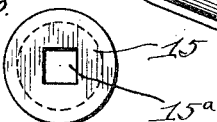
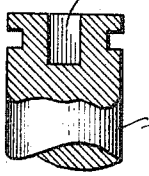

Patented June 26, 1923.

1,459,909

UNITED STATES PATENT OFFICE.

GORDON F. FOWLER, OF OAK PARK, ILLINOIS, ASSIGNOR TO SEARS, ROEBUCK AND COMPANY, A CORPORATION OF NEW YORK.

DEVICE FOR ADJUSTING BOWL AND BOWL SPINDLES ON CENTRIFUGAL SEPARATORS.

Application filed March 29, 1920. Serial No. 369,587.

*To all whom it may concern:*

Be it known that I, GORDON F. FOWLER, a citizen of the United States, residing at Oak Park, in the county of Cook and State of Illinois, have invented certain new and useful Improvements in Devices for Adjusting Bowl and Bowl Spindles on Centrifugal Separators, of which the following is a specification.

The invention relates to means for adjusting or positioning the bowl and bowl spindle of a centrifugal separator of the ordinary commercial type and has for its object the provision of improved means by which the user of an ordinary commercial cream separator may quickly and conveniently adjust the bowl thereof in relation to the bowl spindle with the least possible expenditure of time and effort.

Other objects of the invention will appear from the following description of the preferred embodiment which is also depicted in the drawing forming a part of the specification, the novel features being set forth in the appended claims.

In the said drawing Fig. 1 is a side elevation view of a centrifugal cream separator to which the invention is applied, parts of the separator casing and the bowl and bowl spindle casing being broken away or in section to disclose details of construction.

Fig. 2 is a detail perspective view of the upper extremity of the bowl spindle.

Fig. 3 is an end elevation view of the specially formed end of the shaft supporting the driving gear engaging the worm on the bowl spindle and Fig. 4 is a detail section of the same.

Fig. 5 is a perspective view of a specially formed tool for use in conjunction with the shaft of Figs. 3 and 4 in practicing the invention. The reference character 10 in Fig. 1 indicates a conventional form of cream separator main frame. 11 is the operating handle attached to shaft 12 on which is mounted to rotate therewith the gear 13 meshing with pinion 14 on shaft 15, the latter being parallel with shaft 12, the extremities thereof being journaled in the main frame 10. Shaft 15 carries gear 16 engaging worm 17 on bowl spindle 18, all of these parts with the exception of the modified shaft 15 being of the conventional construction and the upper extremity of the bowl spindle 18 is formed to receive the socket in the bowl, indicated by reference character 19, Fig. 1. The bowl 19 is bored to receive the cylindrical upper end of the spindle 18, the latter being formed with a conical upward extremity, as indicated at 20, Fig. 2, and having also a wedge shaped projection 21 on the extreme outer end of the conical part 20. The portion 21 is preferred to be of keystone or wedge form, its outer surface being preferably at right angles to the axis of the shaft 18 and its end faces also being preferably parallel to each other, but the side faces thereof as indicated at 21$^a$ on diametrically opposite sides of the same are preferably formed to converge toward one common end and consequently diverge toward the other. This wedge shape, as it may be termed, of the part or key 21 formed on the upper extremity of bowl spindle 18 as well as the conical part 20 finds a counterpart in recesses formed at the upper end of the downwardly opening channel formed in the bowl to receive the spindle. This construction of bowl and spindle is also of a conventional form, the intention of same and the results achieved being to always insure that the bowl will be placed upon the spindle in the same relative position, for it will be apparent that without the specially formed locking member 21 on the top of the spindle if the same were of right angular form it would be possible to insert the bowl in either of two positions 180° apart on the spindle. This is not possible with a construction of the form illustrated and described between the co-operating parts of the bowl and spindle. These centrifugal separator bowls as is well known, rotate at high rates of speeds their normal speed of rotation being anywhere from 7000 to 14000 revolutions per minute, and such high speeds necessitate that the bowls and all such rapidly rotating parts be highly machined and carefully balanced, and the balancing effect of the bowl may be achieved only when same is properly adjusted on and in proper relation to the spindle. It results however, in practice that when the user is required to place the bowl after cleaning in position on the spindle it frequently requires much time and patience to be able to place the bowl in the exact relation to the spindle so that the corresponding locking parts on bowl and spindle will fit, as both the bowl and spindle are usually constructed so that the parts fit very closely, in order to prevent any possible looseness which would result harmfully when the parts are revolved at the high rates of speed indicated. It sometimes results that the bowl and spindle will not fit or telescope easily due to changes in the temperature of the metal, slight injuries or abrasions to the metal of the spindle or the introduction of foreign materials into the bowl spindle socket, any of which causes are found to result in great loss of time in attempting to place the bowl in proper position on the spindle. This will be apparent when it is remembered that the operator can not see on the interior of the socket and can in placing the bowl spindle only guess at the proper location. If an error occurs, which is most likely to occur, the bowl sometimes sticks so tightly on the spindle that any attempt to rotate the bowl in relation to the spindle will simply result in turning the gears due to the increased leverage which a turning movement on the spindle will exert on the driving gear. If it be attempted to hold the bowl in the stationary position and rotate the spindle this is impossible with the conventional construction, because the spindle is not accessible and if an attempt be made to rotate the spindle through the driving handle 11 the operator will be unable to supply sufficient power to give the desired short quick turning movement to the spindle because of the tremendous multiplication of leverages involved in this conventional gearing.

In order to overcome these difficulties I have in the present invention provided an improved construction of the spindle driving shaft 15 providing the same in one end thereof accessible from the outside of the casing 10 with a central opening 15$^a$ which will be formed angular or as a square in cross section and will be adapted to take a suitable tool as shown in Fig. 5, having a crank or handle portion 30 at an angle to the body part 31 which terminates in an extremity shaped like the frustum of a pyramid as indicated at 32.

The tool shown in Fig. 5 will preferably although not necessarily be also formed at the end of the body part 30 with a reduced squared portion as indicated at 33 which may conveniently be used in a well known manner to adjust the ordinary cream screws or other cream regulating devices of the separator bowl. This is only a convenience in combining two tools into one and, obviously, has no reference to the present invention, as the device of Fig. 5 will be equally operative for purposes of the present invention if the reduced portion 33 for adjusting the cream screw be omitted.

In operating the machine equipped with the invention the operator will place the bowl upon the spindle without particular regard to the location or adjustment of the locking key 21 and its corresponding socket in the bowl and if, as is usually the case, the bowl does not seat due to the failure of the locking part and the socket in the bowl to correspond the operator will then place the tool of Fig. 5 with the pyramided end 32 in the squared socket 15$^a$ in the shaft 15. This will enable him by grasping the handle part 30 of the tool to rotate the shaft 15 and also through the worm 17 the shaft 18, and he may then by oscillating or rocking shaft 15 oscillate or rock the bowl spindle 18 in relation to the bowl due to the inertia of the latter and the momentum thus imparted to the bowl will if the parts have not already been seated cause the bowl to begin to turn and upon sudden stoppage of the spindle due to pressure applied by the operator to move in relation to the spindle and find its proper seat. The squared part 32 of the tool of Fig. 5 is given the rather abrupt or pyramidical form as shown and described, in order that, should the operator forget to remove this tool from the opening 15$^a$ in shaft 15 after positioning the bowl, there will be no harm result due to the sticking of the tool in the end of the shaft, as the angular or wedged shaped part 32 will as the shaft starts to rotate in the normal operation of the machine soon cause the tool to drop upon the floor and prevent any harm that might come to the engagement of the clothing or parts of the body of the operator should such person come in contact with a rapidly rotating part of this character fixed to the shaft.

I claim:

1. In a centrifugal separator the combination with a bowl of a spindle for supporting said bowl, said bowl and spindle being provided with counterpart recesses and projections for locking said spindle in relation to said bowl, a gear casing, a shaft journalled in said gear casing, a worm on said spindle, a worm gear connected with said shaft and engaging said worm on said spindle, a second gear on said shaft, a third gear for driving said second gear at a multiplied speed, means for driving said third gear, one extremity of said shaft being journalled in the wall of said gear casing and accessible from the exterior thereof, said shaft being provided on said extremity accessible from the exterior of the gear casing with means adapted to receive a tool for imparting rotation thereto in locating said bowl and spindle in relation to said counterpart recesses and projections thereon, and a detachable tool having a part corresponding with and being adapted to engage the said tool receiving part on said shaft.

2. In a centrifugal separator the combination with a bowl of a spindle for supporting said bowl, said bowl and spindle being provided with counterpart recesses and projections for locking said spindle in a predetermined relation only to said bowl, a gear casing, a shaft journalled in said gear casing, a worm on said spindle, a worm gear connected with said shaft and engaging said worm on said spindle, a second gear on said shaft, a third gear for driving said second gear at a multiplied speed, means for driving said third gear, one extremity of said shaft being journalled in the wall of said gear casing and accessible from the exterior thereof, said shaft being provided on said extremity accessible from the exterior of the gear casing with means adapted to receive a tool for imparting rotation thereto in locating said bowl and spindle in relation to said counterpart recesses and projections thereon, and a detachable tool having a part corresponding with the said part on said shaft, the said part being so formed that when the tool is connected with the said shaft the latter may be operated and the tool when released by the hand of the operator will be caused to be quickly detached from the shaft by reason of any turning movement thereof.

In testimony whereof I have signed my name to this specification on this 12th day of March, A. D. 1920.

GORDON F. FOWLER.